United States Patent [19]

Chang

[11] Patent Number: 5,073,070

[45] Date of Patent: Dec. 17, 1991

[54] PANEL FASTENER WITH FLOATING GROMMET ASSEMBLY

[75] Inventor: Peter Chang, North Hollywood, Calif.

[73] Assignee: Avibank Mfg., Inc., Burbank, Calif.

[21] Appl. No.: 582,432

[22] Filed: Sep. 13, 1990

[51] Int. Cl.5 .............................................. F16B 21/18
[52] U.S. Cl. .................................... 411/353; 411/105
[58] Field of Search ............... 411/353, 517, 105, 103, 411/107, 112, 113

[56] References Cited

U.S. PATENT DOCUMENTS

| | | | |
|---|---|---|---|
| 3,765,465 | 10/1973 | Gulistan | 411/353 |
| 4,432,680 | 2/1984 | Molina | 411/105 X |
| 4,464,090 | 8/1984 | Duran | 411/353 X |
| 4,723,881 | 2/1988 | Duran | 411/353 |
| 4,747,738 | 5/1988 | Duran | 411/353 |
| 4,815,908 | 3/1989 | Duran et al. | 411/353 |
| 4,854,795 | 8/1989 | Duran | 411/508 X |

Primary Examiner—Rodney M. Lindsey
Attorney, Agent, or Firm—Poms, Smith, Lande & Rose

[57] ABSTRACT

A panel fastener having a bolt and a floating grommet assembly which assembly includes a grommet fixedly mounted in a hole in a panel and a spacer spaced from the grommet and swaged thereagainst and also against the bolt of the panel fastener. In this matter, the bolt may be held away from the panel, then pushed inwardly into the hole in the panel. The spacing between the grommet and the spacer allows for play between the bolt and the panel to compensate for misalignment between the bolt of the panel fastener and the receptacle to which it is to be fastened.

10 Claims, 4 Drawing Sheets

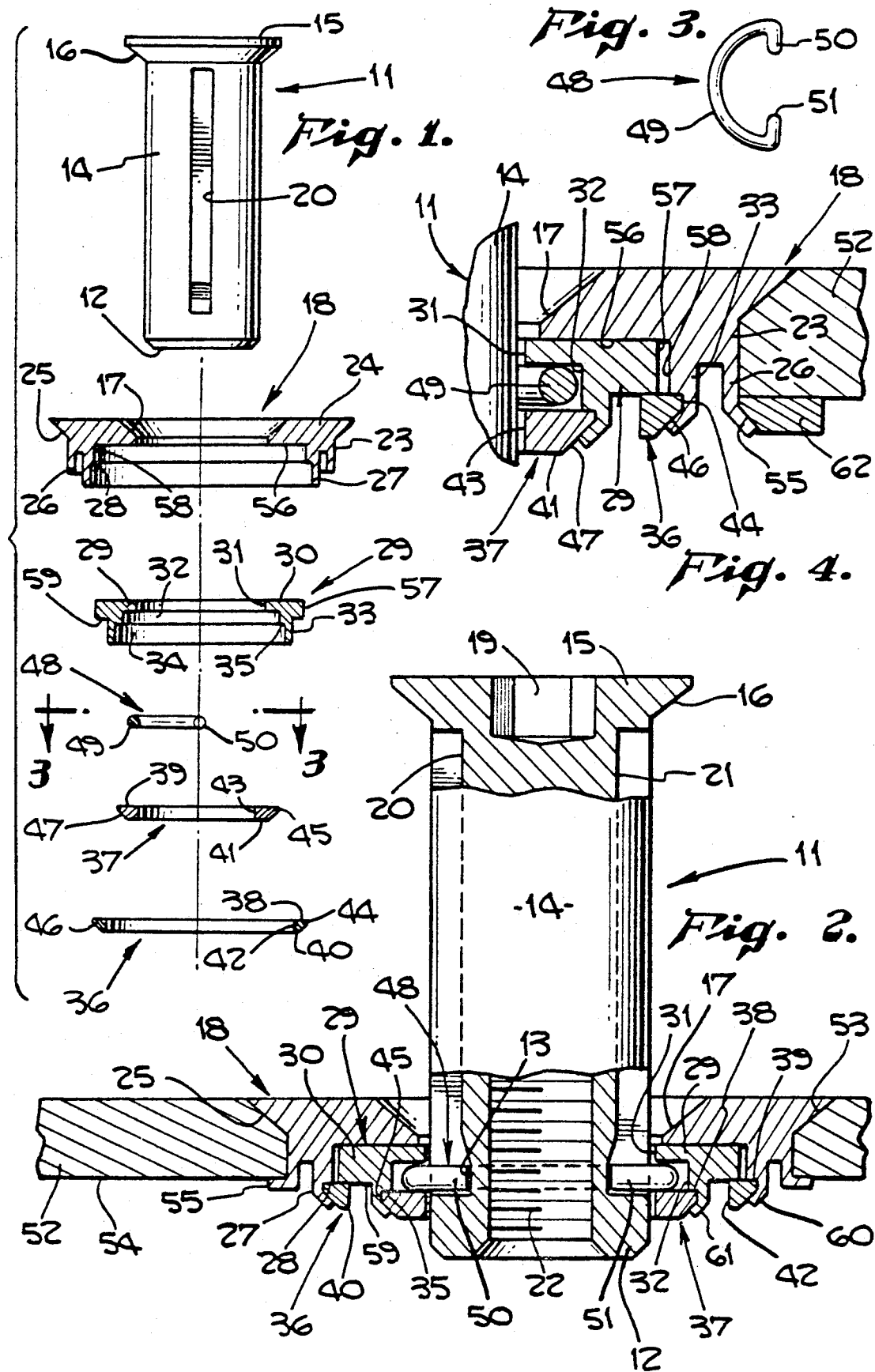

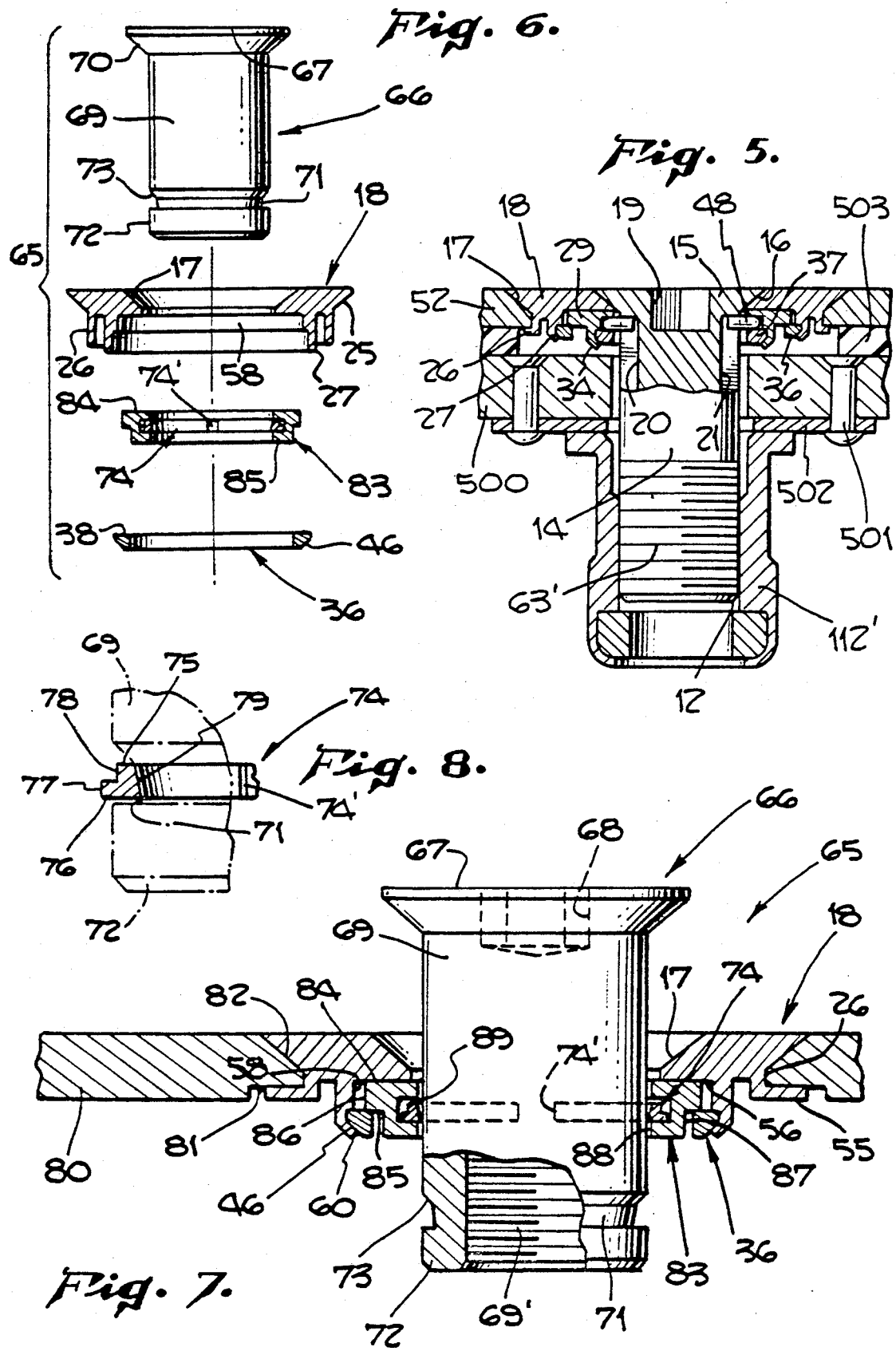

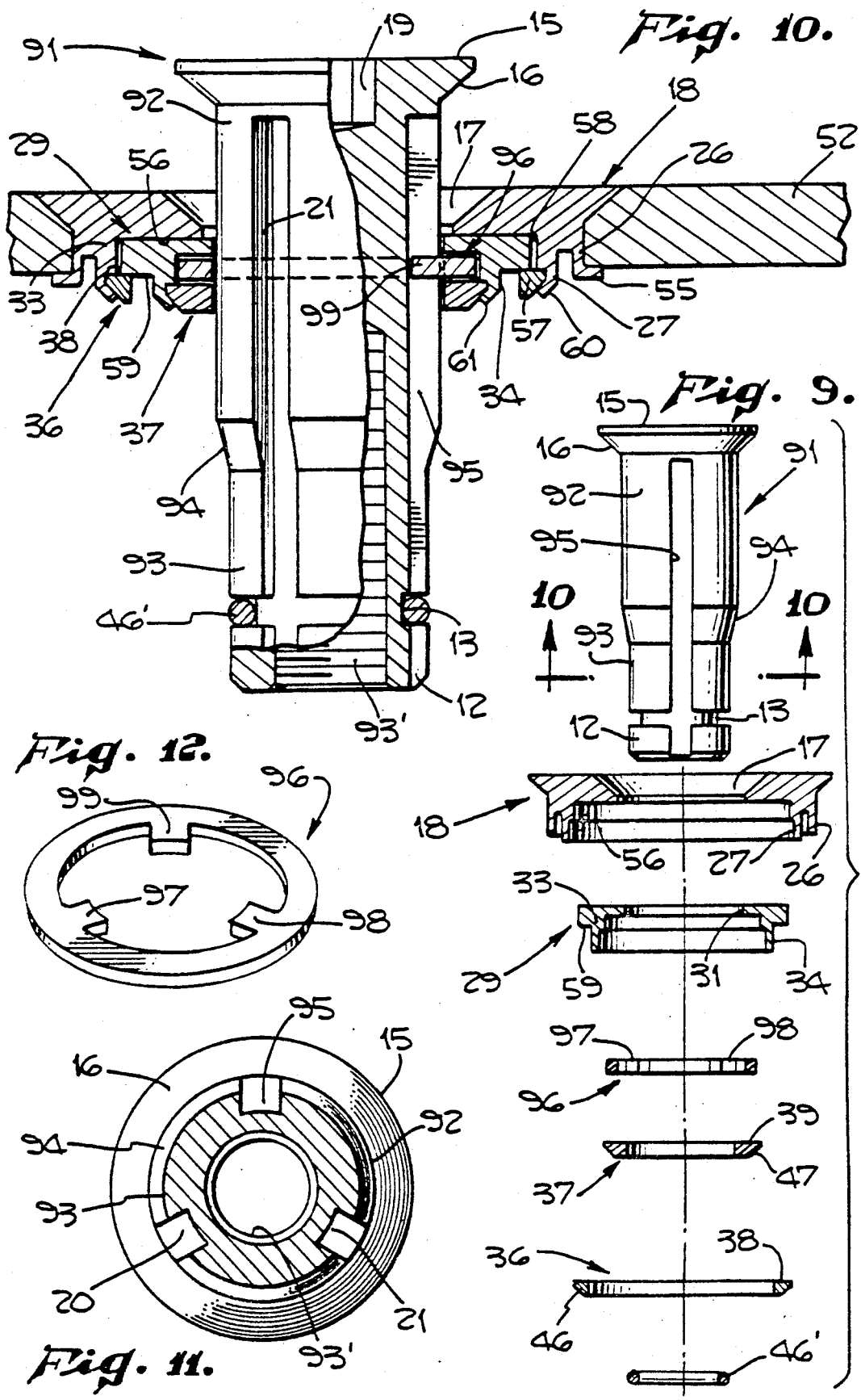

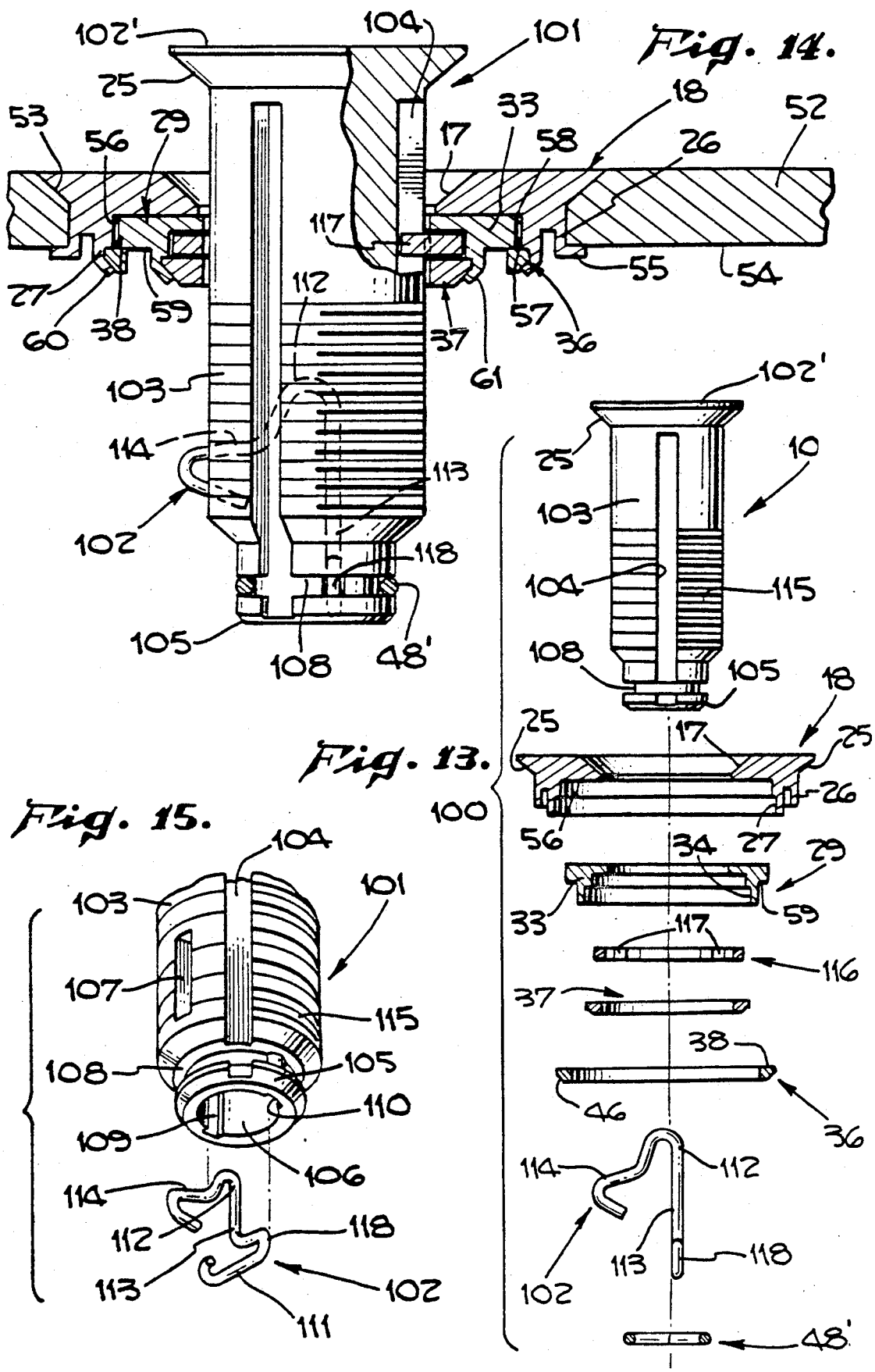

PANEL FASTENER WITH FLOATING GROMMET ASSEMBLY

BACKGROUND OF THE INVENTION

1. Field of the Invention

The invention relates to panel fasteners; and, more particularly, to captive panel fasteners having a holdout bolt and a grommet assembly suitable for securement to aircraft panels or the like providing play between the bolt and the grommet of the grommet assembly.

2. Description of the Prior Art

In U.S. Pat. Nos. 4,464,090; 4,723,881 and 4,854,795; and in U.S. Pat. No. 4,815,908 to Duran et al., all commonly assigned, there are disclosed various types of panel fasteners, each having a grommet assembly mounted in a hole in the panel and a holdout bolt mounted in the grommet of the grommet assembly.

These panel fasteners may be used in situations where the doors of the assembly, such as an aircraft, may be manufactured by a company different from the manufacturer of the substructure of the assembly in which the door is to be installed. The appropriate holes for fasteners for securing such doors to the substructures are predrilled. Unfortunately, when it comes time to assemble such doors to the proper structure, the predrilled holes may be slightly misaligned.

There is thus a need for providing a floating grommet assembly for such panel fastener assemblies to provide for any such misalignment. Such an assembly should have a grommet fixed to the panel with the bolt floating with respect to the grommet to avoid abrading of the panel.

SUMMARY OF THE INVENTION

It is an object of this invention to provide a floating grommet assembly for a panel fastener to provide for slight hole misalignment between structures adapted to be fastened together using such panel fasteners.

It is a further object of this invention to provide such a floating grommet assembly which can be either swaged directly to a panel or to a washer disposed between the grommet assembly and the panel.

It is still another object of this invention to provide a floating grommet assembly which can be adapted to a variety of different fasteners to provide for misalignment between the bolt of such panel fastener and the receptacle to which it is to be secured.

It is still another object of this invention to carry out the foregoing objects wherein the grommet of the grommet assembly is fixed to the panel and a spacer, to which the bolt of the panel fastener is secured, floats with respect to the grommet.

These and other objects are preferably accomplished by providing a panel fastener having a bolt and a floating grommet assembly which assembly includes a grommet fixedly mounted in a hole in a panel and a spacer spaced from the grommet and swaged thereagainst and also against the bolt of the panel fastener. In this matter, the bolt may be held away from the panel, then pushed inwardly into the hole in the panel. The spacing between the grommet and the spacer allows for play between the bolt and the panel to compensate for misalignment between the bolt of the panel fastener and the receptacle to which it is to be fastened.

BRIEF DESCRIPTION OF THE DRAWING

FIG. 1 is an exploded view of a panel fastener having a floating assembly in accordance with the teachings of the invention;

FIG. 2 is an assembled view of the panel fastener of FIG. 1 disposed in a panel;

FIG. 3 is a plan view of one element of the assembly of FIGS. 1 and 2;

FIG. 4 is a detailed view of a portion of the assembly of FIG. 2 showing a washer disposed between the grommet and the panel;

FIG. 5 is a vertical cross-sectional view of a modification of the bolt alone of the embodiment of FIGS. 1 and 2;

FIG. 6 is an exploded view of another type of panel fastener having a floating assembly in accordance with the teachings of the invention;

FIG. 7 is an assembled view of the panel fastener of FIG. 6 disposed in a panel;

FIG. 8 is a detaile view, partly in phantom, illustrating the operation of the assembly;

FIG. 9 is an exploded view of still another type of panel fastener having a floating assembly in accordance with the teachings of the invention;

FIG. 10 is an assembled view of the panel fastener of FIG. 9 disposed in a panel;

FIG. 11 is a view taken along lines 11—11 of FIG. 9;

FIG. 12 is an exploded view of another type of panel fastener having a floating assembly in accordance with the teachings of the invention;

FIG. 13 is an assembled view of the panel fastener of FIG. 10 disposed in a panel; and FIG. 14 is an exploded view of a portion of the bolt and spring alone of the assembly of FIGS. 10 and 11 prior to assembly.

DESCRIPTION OF THE PREFERRED EMBODIMENTS

Referring now to FIG. 1 of the drawing, a panel fastener 10 is shown comprising a bolt 11. Bolt 11 includes a blunt nose 12, a reduced area 13 adjacent nose 12, and a generally cylindrical shank portion 14. Bolt 11 has an enlarged head 15 at the upper end of shank portion 14 which head 15 is tapered on its undersurface at tapered portion 16 leading to shank portion 14. Head 15 is adapted to abut or bear against a countersunk opening 17 (FIG. 2) in a grommet 18 (see also FIG. 1). A hex socket 19 is provided in head 15 as is well known in the art for receiving a suitable wrench therein.

As seen in FIGS. 1 and 2, bolt 11 includes a pair of longitudinally extending spaced grooves 20, 21 extending along the exterior thereof generally parallel to the longitudinal axis of bolt 11. These grooves 20, 21 extend from tapered portion 16 to reduced area 13. The interior of bolt 11 may be threaded at threads 22 to provide for securement to a fastening member, such as the receptacle assembly described and claimed in U.S. Pat. No. 4,723,881, issued Feb. 9, 1988, the teachings of which are incorporated herein by reference. In that patent, a receptacle assembly 12 is disclosed secured to a panel 20 having a threaded stud 15 adapted to threadably engage internal threads of a mating bolt 11 disposed in a mating panel 22. Thus, bolt 11 herein may be secured to a receptacle assembly 12 as in U.S. Pat. No. 4,723,881.

Grommet 18 has a generally cylindrical lower body portion 23 and, preferably, an integral upper outwardly flared enlarged head portion 24. As seen in FIG. 2, grommet 18 is countersunk on its interior (countersunk 17) as heretofore discussed and tapered at tapered portion 25 on the underside of enlarged head portion 24. The bottom or lower end of grommet 18 terminates in a thin walled portion 26 spaced from a second inner thin walled portion 27. Portion 27 has an annular undercut area 28 on the interior thereof for reasons to be discussed.

A spacer 29 is provided (FIG. 1) having a generally flat annular head 30 with a central aperture 31 and an annular central chamber 32 greater in diameter than aperture 31. Spacer 29 has an outer cylindrical main body portion 33 lesser in outer diameter than the outer diameter of head 30. Thus, body portion 33 and chamber 32 serve to define a thin walled annular portion 34 having an undercut area 35 on the interior thereof for reasons to be discussed.

A pair of washers 36, 37 are provided. Each washer 36, 37 has a flat upper wall 38, 39, respectively, a flat lower wall 40, 41, respectively, and a central aperture 42, 43, respectively. Each washer 36, 37 has an outer peripheral wall 44, 45, respectively, and an outer tapered wall portion 46, 47, respectively, leading from wall 44 to wall 40, and from wall 45 to wall 41, respectively. Washers 36, 37 are identical except that washer 36 is greater in diameter than washer 37 as will be discussed.

A C-shaped ring 48 (FIG. 3) is provided having a main arcuate body portion 49 terminating in a pair of inwardly extending ends or legs 50, 51. Legs 50, 51 are adapted to ride in the aforementioned spaced slots 20, 21 of bolt 11, as heretofore discussed and as disclosed in detail in U.S. Pat. No. 4,464,090, issued Aug. 7, 1984. In the U.S. Pat. No. 4,464,090, there is disclosed two versions of such a ring along with the preferred dimensions for enabling the same to ride along the slots 37, 38 of the bolt in the U.S. Pat. No. 4,464,090.

The assembly and installation of panel fastener 10 in the panel 52 of FIG. 2 will now be discussed. Panel 52 has a countersunk opening 53 to which tapered portion 25 of grommet 18 conforms. Thus, grommet 18 is inserted into opening 53 from the top or upper surface thereof in FIG. 2. Thin walled portion 26 (FIG. 1) may now be deformed or swaged directly against the underside 54 of panel 52 to form an annular flange 55 (FIG. 2). This serves to retain grommet 18 to panel 52.

Spacer 29 is now inserted into grommet 18 from the bottom or lowermost side of panel 52 as seen in FIG. 2, with the upper surface thereof abutting against and conforming to the lower wall 56 of grommet 18 with the outer exterior wall 57 of spacer 29 being spaced from the inner wall 58 of grommet 18, as clearly shown in FIG. 2.

The shank portion 14 of bolt 11 is now inserted from the top or outside of panel 52 (FIG. 2) through opening 17 in grommet 18, and through aperture 31 in spacer 29. Resilient ring 48 is now placed over the nose 12 of the shank portion 14 of bolt 11 with legs 50, 51 entering grooves 20, 21. It is to be understood that ring 48 is resilient enough to be forced over nose portion 12, snap into the reduced area 13 at the end of slots 20, 21 (preventing withdrawal) while riding in slots 20, 21. Washer 37 is now placed over nose portion 12 and into the undercut area 35 of spacer 29. The thin walled portion 34 of spacer 29 is now deformed or swaged against the tapered portion 47 of washer 37 forming a flange 61 retaining ring 48 in position between spacer 29 and washer 37.

Washer 36 is now inserted over spacer 29 with its flat upper wall 38 abutting against the lower wall 59 of spacer 29. The thin walled inner wall portion 27 of grommet 18 (FIG. 1) is now deformed or swaged against the tapered wall portion 46 of washer 36 forming a deformed flange 60 (FIG. 2) which served to retain spacer 29 to grommet 18.

It can be easily seen in FIG. 2 that the spacing between spacer 29 and grommet 18 allows for float of the spacer 29 with respect to grommet 18 and panel 52 to which it is secured. This, of course, provides for any misalignment between the apertures between panel 52 and its mating subpanel as described and claimed in U.S. Pat. No. 4,464,090. Although a complete assembly of parts has been disclosed, obviously certain of the parts can be preassembled prior to shipment to the ultimate user.

Although in FIG. 2 the grommet 18 is shown as directly swaged against panel 52, as seen in FIG. 4, wherein like numerals refer to like parts of the embodiment of FIGS. 1 and 2, a washer 62, otherwise identical to washer 36 but greater in diameter, is disposed between grommet 18 and panel 52. The flange 55 thus is deformed or swaged against the washer 62. The advantages of the use of such washer, particularly in conjunction with panels of composite materials, is described in detail in my pending U.S. patent application Ser. No. 07/450,284, filed Dec. 13, 1989, commonly assigned, the teachings of which are incorporated herein by reference. In this application, there is disclosed how a thin walled skirt portion on a nut can be swaged directly against a panel or against an intervening washer to compensate for panels of varying thicknesses. Obviously, these teachings can be applied to the thin walled flange 55 of the grommet of FIG. 2 herein.

Although bolt 11 is shown as interiorly threaded in FIGS. 1 and 2, as seen in FIG. 5, where again like numerals refer to like parts of the embodiment of FIGS. 1 and 2, bolt 63 is threaded on its exterior at threads 63' and adapted to mate with an internally threaded receptacle assembly, such as nut 112' described and claimed in conjunction with FIG. 9 of U.S. Pat. No. 4,747,738, the teachings of which are incorporated herein by reference. Thus, a substructure 500 is shown having rivets 501 holding plate 502 to substructure 500. Nut 112 bears against plate 502. A spacer 503 is provided between panel 52 and substructure 500.

Referring now to FIGS. 6 to 8, wherein like numerals refer to like parts of the embodiment of FIGS. 1 and 2, the invention herein can be applied to a bolt assembly of the type described and claimed in U.S. Pat. No. 4,815,908, issued Mar. 28, 1989, the teachings of which are incorporated herein by reference. In this patent, the grommet has a retaining ring trapped in a cavity therein. Thus, as seen in FIG. 6, panel assembly 65 is shown in exploded view having a bolt 66 with an enlarged head 67 and a hex socket 68 in the head 67 (FIG. 9). Bolt 66 includes a generally cylindrical main body portion 69 with a tapered portion 70 on the underside of head 67 (see also FIG. 7). An annular groove 71 is provided on body portion 69 adjacent nose portion 72 with a tapered portion 73 leading from body portion 69 to groove 71 to provide a ramp.

A retaining ring 74, which may be a circular split ring, as at split 74', is provided, having a flat upper surface 75 (see also FIG. 8), a flat bottom wall 76, a peripheral bottom side wall 77, a peripheral stepped upper side wall 78, and a slanted or angled inner wall 79.

As seen in FIG. 8, top wall 75 is lesser in width than the width of bottom wall 76 and inner wall 79 slants downwardly away from top wall 75, inwardly toward the center axis of ring 75.

Grommet 18 and washer 36 are, of course, identical to the like elements of the embodiment of FIGS. 1 and 2. However, instead of spacer 29, a spacer 83 is provided having a flat top wall 84, a flat bottom wall 85, a first upper peripheral side wall 86 (FIG. 7) and a second lower peripheral side wall 87 of lesser diameter than wall 86, forming an indented or undercut area as shown. Spacer 83 is apertured as indicated at opening 88 and a cavity 89, which may be rectangular in cross-section, is provided about the inner wall 90 of spacer 83 defined by opening 88.

Further, panel 80, as seen in FIG. 7, may be undercut, as at undercut 81. Panel 80 also has a countersunk 82 therethrough. Of course, no undercut need be provided as described and claimed in U.S. Pat. No. 4,815,908.

Thus, in assembling the components of FIG. 6 to panel 80 of FIG. 7, grommet 18 is installed therein as heretofore discussed and thin walled portion 26 is deformed or swaged into undercut area 81, again forming flange 55 retaining grommet 18 to panel 80. Also, as disclosed in U.S. Pat. No. 4,815,908 and as seen in FIG. 4, an intervening washer, such as washer 62 in FIG. 4, between flange 55 and panel 80 (with or without undercut area 81) may be used.

Spacer 83, with ring 74 disposed in cavity 89, is now inserted into grommet 18 from the bottom or lowermost side of panel 80, as seen in FIG. 7, with the upper surface thereof abutting against and conforming to the lower wall 56 of grommet 18 with its outer exterior wall 86 being spaced from the inner wall 58 of grommet 18, as clearly shown in FIG. 7. Washer 36 is now inserted over spacer 83 with its flat upper wall 38 abutting against the lower wall 85 of spacer 83. The thin walled inner wall portion 27 of grommet 18 (as seen in FIG. 6) is now deformed or swaged against the tapered wall portion 46 of washer 36, forming a flange 60 which serves to retain spacer 83 to grommet 18. Again, certain of the parts may be preassembled.

The shank portion 69 of bolt 66 is now inserted from the top or outside of panel 80 through opening 17 in grommet 18 and through aperture 88 in spacer 83. The tapered area 79 of ring 74 allows the ring 74 to be pushed outwardly so that shank portion 69 can move therepast. However, withdrawal of bolt 66 from panel 80 is prevented since ring 74 will snap into groove 71 when bolt 66 is pulled away from panel 80.

Bolt 66 may be either internally threaded, as seen by internal threads 69' in FIG. 7, as bolt 11 in FIG. 1, or externally threaded, as bolt 63 in FIG. 5. Since the structure of such threads is identical, no further illustration is deemed necessary.

Referring now to FIGS. 9 to 11 of the drawing, wherein like numerals refer to like parts of the assembly of FIGS. 1 and 2, bolt 91 is identical to bolt 11 except for the body or shank portion. Bolt 91 thus has a first upper generally cylindrical shank portion 92 joined via a tapered or transition protion 94 to lower generally cylindrical body portion 93 of lesser outer diameter. Also, in bolt 11 in FIGS. 1 and 2, only two slots 20, 21 are provided. However, as seen in FIG. 11, a third slot 95 is provided, slots 20, 21 and 95 extending from the underside of head 15, through upper and lower body portions 92, 93, through nose 12, as seen in FIGS. 9 and 10.

Further, instead of C-shaped ring 48, as seen in FIG. 9, a flat annular ring 96 is provided (FIG. 12) having three inwardly extending projections 97 to 99 spaced similarly to slots 20, 21 and 95. Thus, as discussed in detail in U.S. Pat. No. 4,723,881, the teachings of which are incorporated herein by reference, projections 97 to 99 ride within slots 20, 21 and 95. A resilient locking ring 46' is snapped into groove 13 as in U.S. Pat. No. 4,723,881.

Thus, in assembling the parts of FIG. 9 to panel 52 of FIG. 10, grommet 18 is installed therein as heretofore discussed and thin walled portion 26 is deformed or swaged against panel 52 to form flange 55, thereby retaining grommet 18 to panel 52. Also, as discussed above in conjunction with FIG. 4, an intervening washer between flange 55 and panel 52 (with or without an undercut area, such as area 81 in FIG. 7) may be used.

Spacer 29 is now inserted into grommet 18 from the bottom or lowermost side of panel 52 as seen in FIG. 10, with the upper surface thereof abutting against and conforming to the lower wall 56 of grommet 18 with its outer exterior wall 57 of body portion 33 of spacer 29 being spaced from the inner wall 58 of grommet 18, as clearly shown in FIG. 10.

Bolt 91 is now inserted from the top or outside of panel 52 (FIG. 10) through opening 17 in grommet 18, and through aperture 31 in spacer 29. Washer 96 is now placed over the nose 12 of the shank portion 93 of bolt 91 with extension portions 97 to 99 entering slots 20, 21 and 95. Resilient ring 46' is snapped into groove 13. Washer 37 is now placed over nose portion 12 and into the interior of spacer 29. The thin walled portion 34 of spacer 29 is now deformed or swaged against the tapered portion 47 of washer 37 forming a flange 61 retaining washer 96 in position between spacer 29 and washer 37. Washer 36 is now inserted over spacer 29 with its flat upper wall 38 abutting against the lower wall 59 of spacer 29. The thin walled inner wall portion 27 of grommet 18 (as seen in FIG. 9) is now deformed or swaged against the tapered wall portion 46 of washer 36 forming a deformed flange 60 (FIG. 10) which served to retain spacer 29 to grommet 18. Bolt 91 may be internally threaded as at threads 93' and thus adapted to receive a threaded shank 15 on receptacle assembly 12 in U.S. Pat. No. 4,723,881, the teachings of which are incorporated herein by reference. Also, as heretofore discussed, an intervening washer, such as washer 62 in FIG. 4, may be provided between flanges 55 and panel 52 (with or without any undercut area, as area 81 in FIG. 7). Again, certain parts may be preassembled.

Referring now to FIGS. 13 to 15 of the drawing, wherein like numerals refer to like parts of the assembly of FIGS. 1 and 2, assembly 100 includes a bolt 101 and a spring 102. Bolt 101 and spring 102 are annular to bolt 10 and spring 31 described and claimed in U.S. Pat. No. 4,854,795, the teachings of which are incorporated herein by reference. Thus, bolt 101 has an enlarged head 102', an elongated shank 103, and a plurality, such as three, of spaced elongated slots 104. Slots 104 extend from a point adjacent the tapered underside 25 of head 102' all the way along and through shank 103 through tapered nose 105. Bolt shank 103 is bored in the interior to form a cavity 106 (FIG. 15) and a through slot 107 is provided through the wall of shank 103. An annular groove 108 is provided adjacent nose 105. A pair of elongated grooves 109, 110 are provided on the inner wall of cavity 106 diametrically opposite each other. As discussed in detail in U.S. Pat. No. 4,854,795, at column 3, lines 19-25 and lines 39 et al., spring 102 is generally a single piece of spring material having a lower, generally split O-shaped portion 111 and an upwardly extending upper portion 112. Upper portion 112 extends first upwardly at portion 113 from and integral with portion 111, then curves back on itself and outwardly at first curved portion 114. Bolt shank 103 is threaded on its outer surface at threads 115. A washer 116 with inwardly extending ears or tabs 117 is provided (similar to ring 96 in FIG. 2).

The assembly and installation of panel fastener 100 in the panel 52 of FIG. 14 will now be discussed. Panel 52 has a countersunk opening 53 to which tapered portion 25 of grommet 18 conforms. Thus, grommet 18 is inserted into opening 53 from the top or upper surface thereof as in FIG. 14. Thin-walled portion 26 of grommet 18 may now be deformed or swaged directly against the underside 54 of panel 52 to form an annular flange 55 retaining grommet 18 to panel 52.

Spacer 29 is now inserted into grommet 18 from the bottom of panel 52 with the upper surface thereof abutting against and conforming to the lower wall 56 of grommet 18 with the outer exterior wall 57 of body portion 33 of spacer 29 being spaced from the inner wall 58 of grommet 18.

Bolt 101 is now inserted through the countersunk opening 17 in grommet 18 and washer 116 is placed on bolt 101 so that ears 117 ride in slots 104. Spring 102 is now inserted into bore 106 by sliding portion 118 (FIG. 15) into grooves 109, 110 and the curved portion 114 snaps or exits out of slot 107 as seen in FIG. 14. Stop ring 48' is now snapped into groove 108. Washer 116 cannot move past ring 48'. The foregoing briefly describes the assembly of parts which is disclosed in detail in U.S. Pat. No. 4,854,795. Further, variations of the spring 102 are also disclosed therein, the teachings of which are incorporated by reference.

Washer 37 is now placed over nose portion 105 and thin-walled portion 34 of spacer 29 is swaged thereagainst as seen in FIG. 14 forming flange 61 to retain the spacer 29 to washer 37 and washer 116 between washer 37 and spacer 29. Also, as disclosed in U.S. Pat. No. 4,815,908 and as seen in FIG. 3, an intervening washer between flange 55 and panel 54 (with or without an undercut area) may be used.

Washer 36 is now inserted over spacer 29 with its flat upper wall 38 abutting against the lower wall 59 of spacer 29. The thin-walled inner wall portion 27 of grommet 18 is now deformed or swaged against the tapered wall portion 46 of washer 36 forming a deformed flange 60 which serves to retain spacer 29 to grommet 18.

It can be seen that there is disclosed a variety of panel fasteners each having a floating spacer/grommet assembly. The spacing between each spacer 29 and each grommet 18 may be about 10 to 15 thousandths of an inch all around (resulting in total deviation on each side of about 20 to 30 thousandths of an inch). Certain of the parts may be preassembled.

I claim:

1. In a panel fastener assembly comprising a bolt having an enlarged head at one end, a tapered nose at the other end and an intermediate body portion, a groove provided on the bolt between the nose and the body portion, a grommet assembly encircling the bolt between said head and nose, said grommet assembly having an annular retaining ring mounted therein, the improvement which comprises:

said grommet assembly including a grommet member having an annular cavity therein, and said grommet assembly including a spacer member disposed in said grommet member cavity, said spacer member also having an annular cavity therein surrounding said bolt, said annular retaining ring surrounding said bolt being mounted in said spacer member annular cavity, said ring thereby encircling said bolt between the head and nose thereof and being adapted to ride along the body portion of said bolt and snap into said groove, said spacer member being laterally movable with respect to said grommet member, said grommet member being swaged against said spacer member.

2. In the assembly of claim 1 wherein said grommet member has a first outer thin-walled portion and a second inner thin-walled portion spaced from said first portion swaged against a washer surrounding said spacer member between said spacer member and said second thin-walled portion.

3. In the assembly of claim 1 wherein said bolt is threaded on the interior thereof.

4. In the assembly of claim 3 wherein said shank portion is internally threaded.

5. In the assembly of claims 3 or 4 including a washer surrounding said shank portion, said spacer member having a thin-walled portion extending from said annular chamber therein swaged against said last mentioned washer.

6. In the assembly of claim 3 including a washer surrounding said spacer member, said second thin-walled portion being swaged against said washer.

7. In the assembly of claim 3 including a washer surrounding said first thin-walled portion disposed against the blind side of said panel, said first thin-walled portion being swaged against said last mentioned washer thereby retaining said grommet member to said panel.

8. A captive panel fastener assembly comprising a bolt having an enlarged head at one end tapered on its underside, a nose at the other end having a tapered portion tapering downwardly and inwardly toward the center axis of said bolt, and an intermediate body portion with a groove provided on the bolt between the nose and the body portion, a panel having an exterior side and an interior side with countersunk opening on said exterior side leading into a hole extending therethrough, said countersunk opening being a tapered cavity in said panel on the exterior side thereof with said hole being a generally cylindrical aperture through said panel leading from said tapered cavity to the interior side of said panel, a grommet assembly mounted in said hole, said grommet assembly having a tapered cavity therein, the tapered underside of said bolt head conforming to said grommet assembly tapered cavity with said tapered underside being adapted to engage said grommet assembly tapered cavity presenting a flush upper surface on the exterior of said grommet assembly, the grommet assembly including a grommet member having a preformed outwardly flared portion at one end disposed entirely in said tapered cavity of said countersunk opening and conforming thereto and a generally cylindrical portion integral with and extending from said preformed flared portion disposed in said generally cylindrical aperture and conforming thereto, and a terminal end on the interior side of said panel integral with and extending from said cylindrical portion retaining said grommet member against the interior side of said panel, the improvement which comprises:

said grommet member having an annular cavity therein, and said grommet assembly including a spacer member disposed in said grommet member cavity; and said spacer member also having an annular cavity therein surrounding said bolt, an annular retaining ring surrounding said bolt mounted in said spacer member annular cavity, said ring thereby encircling said bolt between the head and nose thereof and being adapted to ride along the body portion of said bolt and snap into said groove, thereby retaining the bolt in a first position held out from the exterior side of said panel and retaining said bolt in a second position wherein said bolt is adapted to engage a receptacle assembly mounted in an adjacent subpanel, the retaining ring being adapted to move along the body of said bolt toward said head when said bolt is inserted into said grommet assembly, then back along the body of said bolt and into the groove of said bolt when said bolt is moved to said first position, said spacer member being laterally movable with respect to said grommet member, said grommet member being swaged against said spacer member.

9. In the assembly of claim 8 wherein said grommet member has a first outer thin-walled portion swaged against the underside of said panel and a second inner thin-walled portion swaged against a washer surrounding said spacer member between said spacer member and said second thin-walled portion.

10. In the assembly of claim 9 wherein said panel is undercut on the blind side thereof, said grommet member being swaged thereagainst.

* * * * *